March 6, 1934.   A. E. OSBORN   1,949,431
PROTECTOR
Filed March 29, 1932

INVENTOR:
Alden E. Osborn.

Patented Mar. 6, 1934

1,949,431

UNITED STATES PATENT OFFICE

1,949,431

PROTECTOR

Alden E. Osborn, New York, N. Y.

Application March 29, 1932, Serial No. 601,

9 Claims. (Cl. 137—91)

My invention relates to improvements in protectors for threaded or other objects and to a method for protecting such objects.

An important object of my invention is to provide a device for the protection of threads on pipes and the like and to prevent the same from becoming battered or damaged through handling or shipping. While the invention is shown in the drawing as being particularly applicable to pipes and other cylindrical objects, it will be understood, however, that it is well adapted for use in connection with many other articles and need not be limited in size or shape as it may be successfully used with articles of square, hexagonal and other cross sectional shape, nor is it limited to protecting the outside of the object to which it is applied.

It will be further understood that while in the drawing, the protecting member shown is of relatively small length in relation to the object to be protected, it is intended that it may cover the entire object should full length protection be desired. It will also be seen that by closing one end of the protector it will serve as a cap for the article over the end of which it is placed.

A further object of my invention is to provide a device of the above character which does not depend upon the threads of the article to be protected to maintain the same in position thereon, and may therefore be used at will on pipes or the like having either right or left hand threads.

A further object of my invention is to provide a simple and efficient means either with or without the conventional lugs, threads, or projections now in use whereby my protector may be easily and quickly applied to or removed from the article which it is designed to protect, and which, when once applied, will not be apt to come off or be lost even during excessive handling of the pipe or other article.

A further object of my invention is to provide means for retaining the device in position, which also serves to insulate it from the object which it protects, and when such means is comprised of relatively soft material, it serves as a cushion between the sleeve or cap and the protected object, thus shielding the object from damage to a much greater extent than would be the case if the sleeve or cap were in direct contact with it.

A further important object of my invention is to provide a device of the above character which will be sturdy of construction, simple and efficient in application and operation and inexpensive to manufacture.

Other objects will be in part obvious from the annexed drawing and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, a drawing depicting a preferred form of the invention has been annexed as part of this disclosure, and in such drawing like characters of reference denote corresponding parts throughout all of the views, in which—

Figure 1:
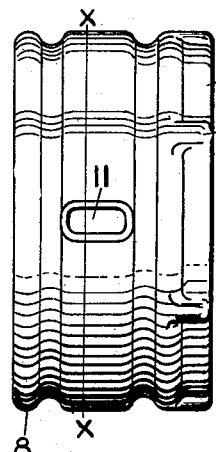
Fig. 1 represents a side elevation of a preferred embodiment of my invention.
Figure 2:
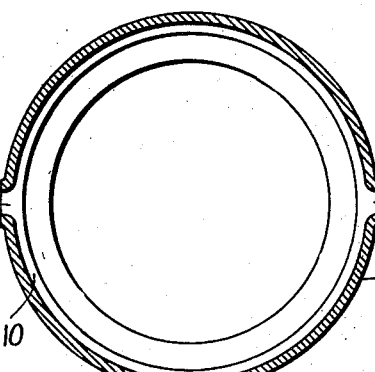
Fig. 2 is a sectional view taken along line X—X of Fig. 1.
Figure 3:
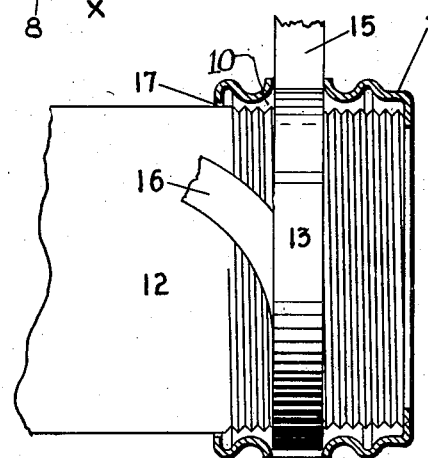
Fig. 3 is a side view partly in section and showing one form of retaining means.
Figure 4:
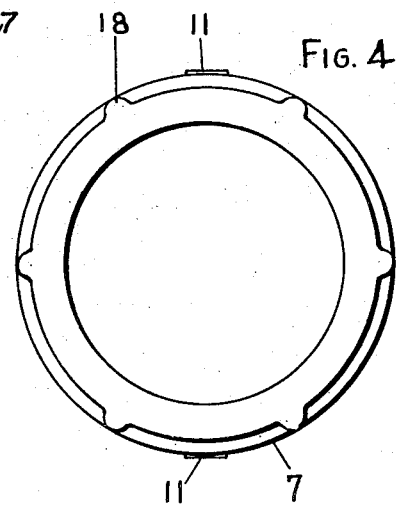
Fig. 4 represents an end view of Figs. 1, 2 and 3.

Referring to Figs. 1 to 4 of the drawing, the device comprises a sleeve member 7 which may be of any material depending upon the nature of the article to which the invention is to be applied and preferably of sufficient rigidity as to withstand the blows and pressure to which such articles are subjected. To add to the sturdiness of the sleeve stiffening ribs 8 may be disposed around its circumference, but it should be understood that these ribs may be omitted or their form changed to meet special requirements. The casing or sleeve contains a channel 10 part-way along its length, said channel being provided with one or more circumferential openings 11. Within this channel 10 is situated, when the device is in position upon the pipe or other article 12, a retaining means 13 of a material sufficiently flexible to permit it being introduced through the opening 11 into the channel 10 in the sleeve and with sufficient flexibility to permit of its bending upon passing through said opening, and of its also being bent to pass around the circumference of the object that is to be protected. It is preferred that said material be of a soft nature so that it will not injure the object which it is designed to protect when said object is within the sleeve and when the material is held against the same with considerable pressure.

Figure 5:
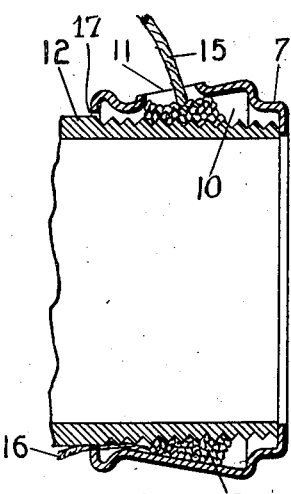
Fig. 5 represents a modification of my invention.
Figure 6:
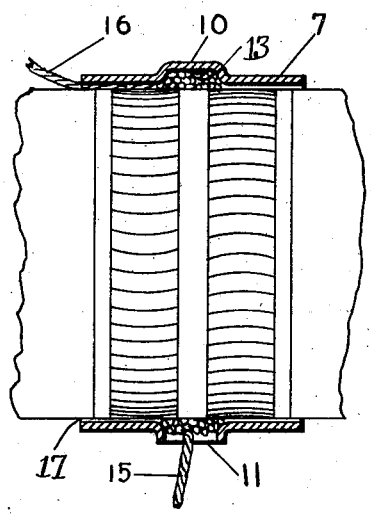
Fig. 6 represents a still further modification thereof.

It has been found that such material as rope, wire, paper, wood, or fabric strips are particularly well adapted for this purpose, but it should be understood that any material capable of insertion through the opening 11 in the sleeve and capable of being bent about the object to be protected can be used. In these figures, the packing material 13 is shown in the form of a strip which is of sufficient width to completely fill the channel 10 in the interior of the protecting sleeve 7. However, the material need not be in that particular form but can be successfully used, as shown in Figs. 5 and 6, in a cord like form as it simply serves to occupy the channel 10 between the sleeve or cap 7 and the protected object, and it need not be of any special shape when introduced through the opening or maintain that shape when it is in position. It will be noted upon examination of Fig. 2 that the protecting sleeve 7 is provided with two openings 11 through which the filling or packing material 13 could be introduced. However, one opening is usually sufficient, although in some cases a plurality of openings may be desirable, and it is to be understood that such modification is contemplated.

In applying the device to the part to be protected, the end 15 of the packing material 13 is introduced through the opening 11 in the sleeve 7 and the end 16 thereof is drawn out of the open end of the sleeve through which the protected object 12 is adapted to be inserted, the sleeve having a clearance 17 between it and the protected object when it is on the object. Thus the end 16 of the packing material and the packing material 13 can be prevented from rotating when the sleeve is rotated about the object, or they can be rotated with the protected object when the sleeve is held from rotation and the object turned, the result being that additional packing material will be drawn through the opening 11 in the sleeve and wrapped about the object to be protected.

It will be readily seen that upon continued rotation of the sleeve or cap about the pipe or other article, a sufficient amount of the material 13 will be drawn through the opening 11 to increase the diameter of the packing material wound around the object to be protected to such a dimension as to cause it to press heavily against both the sleeve and the protected object, so that the sleeve is held firmly in position. By this means so much packing material can be introduced that considerable outward pressure can be placed upon the sleeve and inward pressure upon the object, and while in the views I have shown the packing means applied to a part of the object having a relatively rough surface, it is possible to exert sufficient pressure to create friction to an extent that prevents the longitudinal movement of the sleeve under ordinary conditions even though the object about which the material is wound has a relatively smooth surface.

In order to rotate the sleeve, it may in some cases be desirable to provide projections or serrations that can be engaged by a suitable tool and thus permit a greater leverage than could be obtained by hand or in the case of a perfectly smooth sleeve. I have in these figures shown a number of enlargements 18 near one end of the sleeve so that it can be turned by a suitable wrench or other tool if so desired.

In the modification shown in Fig. 5, the channel 10 within the sleeve 7 has a sloping wall so that it is shallower at one side than at the other and the opening 11 through which the packing material 13 is introduced into the channel intersects the sloping wall-portion thereof, and the shallow side of the channel is placed toward that end of the sleeve in the direction in which it is desired to move the sleeve longitudinally. The effect of having the channel with a sloping wall as in this view is that when the packing material is introduced into the opening, it tends to act against the sloping surface in the channel and react against the object on which the sleeve is mounted and thus draw the sleeve into position without requiring longitudinal pressure thereon from an external source. In this form, the longitudinal movement of the sleeve may be achieved without completely filling the entire channel.

In the further modifications shown in Fig. 6, the sleeve is shown as surrounding the object to be protected with the object extending from both sides of the sleeve, the part within the sleeve being the portion that may be damaged and the parts extending from the sleeve being those less likely to need protection. A channel 10 is shown in this form of sleeve, although obviously a channel need not be provided either in this form or in the other forms, but is desirable because it positively prevents movement of the sleeve upon the exterior of the packing 13.

Without further analysis the foregoing will so fully reveal the gist of this invention that others can by applying current knowledge readily adapt it for various applications without omitting certain features that, from the standpoint of the prior art; fairly constitute essential characteristics of the generic or specific aspects of this invention, and therefore such adaptations should be and are intended to be comprehended within the meaning and range of equivalency of the following claims.

I claim:

1. A protector comprising a rigid member adapted to form a substantially annular channel intermediate its length, adjacent a surface of at least a portion of an article to be protected, the wall of said member being perforated to provide an aperture entering said channel, and said member having a clearance at one of its ends, a flexible retaining means extending through said aperture and through and beyond the clearance and adapted to be drawn into the channel through the aperture by rotation of the rigid member relative to the article, when the retaining means is anchored.

2. A protector comprising a rigid member adapted to form in conjunction with at least a portion of an article to be protected, a tapered substantially annular space between a surface of said portion of the article and the member, said member having an aperture in a wall thereof, and flexible retaining means adapted to be introduced through said aperture, and when anchored, drawn into said space by relative rotation between the member and the article to produce lateral and longitudinal pressure.

3. A protector comprising a rigid member adapted to form a substantially annular channel with a slanting wall, and being of a size to form a tapered space between the member and a surface of at least a portion of an article to be protected, said member being constructed with an aperture entering one side of the channel, and flexible retaining means adapted to be introduced through said aperture, and when anchored, drawn into said space by relative rotation between the member and the article to produce lateral and longitudinal pressure.

4. A protector comprising a rigid member adapted to form a substantially annular channel intermediate its length, adjacent a surface of at least a portion of an article to be protected, and a clearance at a side of the channel, the wall of said member being perforated to provide an aperture entering said channel, and said member having a flange at one end arranged to overlie the end of said article, a flexible retaining means extending through said aperture and through and beyond the clearance and adapted to be drawn into the channel through the aperture by rotation of the member relative to the article, when the retaining means is anchored.

5. A protector comprising a rigid member adapted to form a substantially annular space between a surface of at least a portion of an article to be protected and the member, said member having an aperture in a wall thereof, and flexible retaining means adapted to be introduced through said aperture, and when anchored, wound into the space between said rigid member and the article and against a camming surface on said rigid member, by relative rotation between the member and the article, to create a pressure on said surface tending to move the member longitudinally in relation to the article.

6. A protector comprising a rigid member adapted to form a substantially annular space between a surface of at least a portion of an article to be protected and an adjacent surface of said member, said member having an aperture in a wall thereof, and flexible retaining means adapted to be introduced through said aperture, and anchored with respect to said article independently of structural modification of the article, and drawn into said space and into direct engagement with the member and the article by relative rotation between the member and the article.

7. A pipe protector comprising a rigid member adapted to form a substantially annular space between a threaded surface of an end portion of a pipe and the adjacent surface of the member, and flexible retaining means upon which said member is arranged to move, adapted to engage the threaded surface and to be drawn into said space by relative rotation between the member and the pipe to conform with and protect the threads.

8. The combination of a pipe having an externally threaded end, a sleeve surrounding the threaded end of the pipe and having a flange at one end extending over the end of the pipe, and a clearance between the pipe and the sleeve at its other end, said sleeve having an annular channel intermediate its length and being constructed with an aperture, and a cord drawn through said aperture into said channel, wound around the pipe and extending through the clearance at the end of the sleeve.

9. The herein described method of securing a protector having an aperture in the wall thereof, to an article to be protected, comprising introducing a retaining element through the aperture of the protector, anchoring an end thereof with respect to said article and independently of structural modification of the article, and winding the element between the protector and the article by rotating the protector and the article relative to each other.

ALDEN E. OSBORN.